UNITED STATES PATENT OFFICE 2,518,978

HOG CHOLERA VACCINE

Herald R. Cox, Suffern, and Hilary Koprowski, Pearl River, N. Y., assignors to American Cyanamid Company, New York, N. Y., a corporation of Maine No Drawing. Application September 12, 1946, Serial No. 696,617

5 Claims. (Cl. 167—80)

This invention relates to the art of immunizing hogs against hog cholera. More particularly, the invention relates to a new method of obtaining an immunizing vaccine of reduced virulence which, when injected in hogs, will give rise to an adequate production of protective antibodies without subjecting the animal to the dangers attendant the use of vaccines containing the normal virulent hog cholera virus. The invention also includes the new vaccine and its use.

Although hog cholera has been recognized as an independent disease for more than half a century no means has yet been found to cure an infected animal. The disease, which is widespread throughout the world, causes enormous economic losses. Infected herds of non-immune hogs suffer a mortality between 85 and 95%. It is spread by garbage containing infected pork, by introduction of new infected stock into the herd, by "breaks" following the use of serum-virus for vaccination, and possibly by other means.

Hog cholera is an acute septicemic disease characterized by high fever developing after an incubation period of from 4 to 5 days, inflammatory swelling of the conjuntiva and lymph glands and numerous hemorrhagic lesions which may occur in many or all parts of the body. Various other symptoms have been reported. The symptoms are frequently complicated by the action of secondary invaders such as Salmonella and Pasteurella. A competent veterinary can correctly diagnose the disease, however, without great difficulty.

The only practical way of controlling hog cholera is to immunize the animals. Injection of antibodies will develop a passive immunity of a few weeks' duration but, obviously, this alone is useful only in controlling an epidemic in a locality. To obtain life-long immunity it has been considered necessary to inject the living causative virus into the hog and allow it to produce its own antibodies. As the injection of infective virus would in itself cause the hog to develop hog cholera it is necessary to inject at the same time a quantity of hyper-immune hog serum. By this combined virus-serum vaccination it is possible for the antigenic action of the virus to develop immunity in the hog while the antibodies of the hyper-immune serum enables the animal to survive the viral infection.

The serum-virus method of immunizing hogs has a number of serious disadvantages but, even so, it is the present day method of choice. Production of virus for use in these procedures is not difficult but the production of serum is. Numerous strict rules and regulations of the United States Department of Agriculture govern the production of the immunizing sera. To prepare hyper-immune sera it is necessary to first immunize hogs by a combined serum-virus injection. These hogs are injected intravenously with massive doses of virus at least ninety days after immunization. Ten days after hyperimmunization the animal may be bled to obtain hyperimmune serum. Later not more than three additional bleedings may be taken. The animal is then considered worthless and is disposed of. The difficulty of the process and the limited volume of serum obtained from each hog make it apparent that the process has many inherent drawbacks.

Another serious disadvantage of the present virus-serum method lies in the very fact that virulent infective virus is administered to the hog. The virus is propagated in the animal and is excreted, thus providing a source of infection to untreated, non-immune hogs. It might be said in fact that the treatment itself tends to maintain the disease. There can be little hope of wiping out the disease completely as long as the serum-virus method is used.

Still another serious disadvantage of the present virus-serum method has been mentioned above. Frequently, through errors of production which cannot be completely avoided, the serum may not contain enough of the antibody substance to prevent pathological infection of the animal by the virus employed in vaccination. As a result the vaccinated animals may succumb to the disease. This condition is known as a serum "break." Analogously, the virus used may be attenuated or less virulent than necessary and, as a result, natural immunity is not developed. The passive immunity derived from the immune serum soon disappears and the hog is then subject to infection.

Numerous attempts have been made to avoid the necessity of using a virulent form of the virus. Most of these attempts have been directed to the production of an attenuated virus or some physically or chemically modified viral form that will be antigenic yet not be sufficiently virulent to produce the full effects of the disease in the hog. Practically none of the viral preparations modified by physical or chemical means have been of value in producing immunity. Some vaccines containing modifying agents such as crystal violet or oil of eucalyptus have been prepared and used with varying degrees of success. These products have numerous disadvantages of their own, however.

Attempts to prepare a less virulent, attenuated form of the hog cholera virus by propagating the virus in another species of animal, as in the manner in which the canine distemper virus is attenuated by growth in ferrets, have also been unsuccessful. One of the principal difficulties lies in the fact that, unlike many infectious agents, the hog cholera virus is specific to hogs and will not propagate under ordinary circumstances in most other animals. Efforts to propagate the virus in other animals as widely divergent as mice, rats, guinea pigs, rabbits, dogs, cats, horses, donkeys, oxen, goats, pigeons, chickens and others have shown that these animals are not receptive to hog cholera virus. It has also been found that the virus will not propagate in incubated eggs.

Although the hog cholera virus has been transmitted to various animals by inoculation these animals failed to develop high fever, lesions or other evidence of illness. The virus was found in the blood stream of some of these animals, particularly ruminants, several days later. When such blood was defibrinated and injected into susceptible hogs the hogs developed typical symptoms of hog cholera. In no case did the pathogenicity of the virus for the hog appear to be modified. The low viral content of the blood merely indicated a dilution of the original material.

In a series of experiments sheep were injected with swine fever virus. Seven days later 2 cc. of blood from a sheep was injected into a second sheep and this procedure continued for a series of ten passages. Pigs which were inoculated with blood from the sheep all died after showing typical symptoms of swine fever. None of the sheep showed any symptoms of illness nor did the virus appear to be attenuated to any extent. The production of antibodies in the serum of the sheep could not be demonstrated.

Despite the failure of numerous investigators to establish hog cholera in various experimental animals and obtain therefrom an attenuated virus of low virulence but possessing the ability to produce antibodies in hogs, we have finally succeeded in accomplishing this result by the technique which we shall describe hereinafter. By our new process it is possible to inoculate animals other than hogs with the virulent organism of hog cholera and, after a relatively large number of serial passages through the animal, obtain a virus of such modified properties that it will, when injected in hogs, give rise to the production of antibodies effective in immunizing the hog against hog cholera but does not produce the fatal pathological symptoms associated with normal hog cholera. Injection of the modified virus, therefore, into susceptible hogs will result in their immunization. The use of virulent viral preparations and hyper-immune sera is thereby avoided.

In order to establish the virus in experimental animals it is necessary that certain procedures be followed. According to our process, a suitable animal, such as the rabbit, is injected with hog cholera virus of known virulence. As previously reported, the rabbit does not become febrile or exhibit symptoms of illness although the virus may be detected in its blood stream for some hours after inoculation. After a period of time of from about one day to six days after inoculation the rabbit is sacrificed and its spleen removed. The spleen, when prepared as will be described hereinafter, will be found to contain enough virus to inoculate a hog and thereby bring about typical hog cholera in the animal. The spleen is chosen, preferably, in the early rabbit passages in that it seems to contain a concentration of virus. Other organs, such as the brain, liver, etc., or even the blood itself, may also contain enough of the virulent organism to produce the disease in non-immune hogs.

Although the first rabbit fails to develop signs of illness, the inoculated hog does. After two to five days the febrile hog is sacrificed and a suspension of its spleen is made and the virus injected into another rabbit. This procedure of inoculation from hog to rabbit to hog to rabbit is repeated until eventually the rabbit commences to show signs of fever. The infectious spleen preparation of the rabbit may then be injected intravensously into additional rabbits with an occasional passage through a hog until the virus has been so adapted that the blood of one rabbit when injected into another will give rise to a high and persistent fever. After numerous passages through rabbits, at least 5 and preferably 20 or more, the virus becomes so modified in character that it no longer produces the full pathological effects of hog cholera when injected into susceptible hogs. Despite its low virulence the virus is antigenic and gives rise to the production of antibodies which immunize the hog for its life.

The exact mechanism by which the non-virulent virus is produced in the rabbits is not clear. One possible explanation to which, however, we do not wish to be bound, appears to be based on the hypothesis that amongst the millions of viral forms that are present in a single inoculation of virulent hog cholera virus into the rabbit there are some which can adapt themselves to propagation in the rabbit. As the virulent form of the virus cannot propagate in the rabbit, this form is the first to die out. Undoubtedly, these few viral forms which apparently can survive for a longer period in the rabbit, which forms may be mutants, would likewise perish in the rabbit host in time. When the spleen is removed and made into an inoculum for the hog it contains a higher proportion of the mutant strain than was originally present in the inoculum used on the rabbit. Back in the hog both strains of virus propagate and are increased in such number that they can again be collected and used to inoculate another rabbit. As will be seen, by repeated transfer from hog to rabbit to hog, etc. it is possible to build up a relatively high proportion of the mutant strain while decreasing the proportion of the more virulent strain. Accordingly, after a sufficient number of rabbit passages the preparation contains scarcely enough of the virulent form to cause hog cholera in a hog. The non-pathogenic mutant strain, however, is easily propagated and, when injected into the hog, causes the production of antibodies without development of the pathological symptoms.

To illustrate the new process infected hog spleen, derived from an animal which was sacrificed on the 6th day after inoculation with hog cholera virus, was made into a 10 per cent suspension in saline in a Ten Broeck grinder. The suspension was centrifuged for five minutes at 1000 R. P. M. and 3 ml. of the resulting supernatant was inoculated intravenously into a rabbit. The rabbit showed no elevation of body temperature but was sacrificed on the 3rd day after inoculation and a 10 per cent suspension of its spleen inoculated into a pig. The latter showed fever up to 105-106° F. on the 2nd, 3rd and 4th days after inoculation and was sacrificed on the 5th day. A suspension of its spleen, in turn, was injected into a rabbit. The virus was transferred by means of this technique of alternation between the hog and one or two rabbit passages until it had been carried through six intermittent rabbit passages. Out of seven rabbits injected with the 6th passage virus, three showed slight elevation of temperature on the 2nd day after inoculation, and were sacrificed at that time. Their spleens were pooled and suspensions of them were injected intravenously into another group of rabbits. These animals reacted again with a slight fever and were sacrificed in turn, and the virus was thus transferred for two more rabbit passages. At this stage, none of the rabbits showed increased temperatures on routine checking and no virus was detected in their spleens by sub-inoculation of swine.

It became obvious from the disapperance of the virus through the rabbit passages that the virus was either merely transferred from one rabbit to another without proliferation or that the spleen was removed at a time during which the virus was not present in an infective form. In order to test the latter possibility, a rabbit spleen suspension, representing the 3rd rabbit passage, was injected into three rabbits, temperatures of which were taken every 2-3 hours throughout the 24 hour period for the next 5 days. All three rabbits reacted with a febrile response on the 2nd night after inoculation. Curiously enough the elevated temperature lasted only 2-3 hours after which it started to drop. The animals were sacrificed during this febrile period and a pool of their spleens when injected into swine proved to contain hog cholera virus. By adopting the above technique of taking temperatures every two or three hours day and night, the virus was carried through many rabbit passages by spleen transfer.

To establish identity of the virus a pig injected with the 6th rabbit passage virus reacted with a 6th day febrile period but survived and was subsequently placed in contact with two pigs which were sick following the injection of a known strain of virulent hog cholera virus. The injected animals were kept in an unclean pen with two normal contact control pigs. The two animals injected with the hog strain of the virus died and the two control swine showed fever after 5 and 6 days of contact respectively, and subsequently died on the 12th and 19th days. On autopsy, typical lesions of hog cholera were observed whereas the pig, injected with the 6th rabbit passage virus, remained asymptomatic during the entire 30 day observation period. Later, when this hog was challenged with virus of known virulence, it resisted infection whereas control hogs died. Swine injected with the 8th and 9th rabbit passage spleen-virus which became ill were autopsied after death. Typical lesions of hog cholera were observed. Obviously, the hog cholera virus was being maintained by the rabbit passages but had not become attenuated sufficiently by the relatively low number of passages.

Inasmuch as it is more convenient to use infected blood as a source of inocula than it is to prepare suspensions of spleen or other organs the use of infected blood was adapted soon after the virus was established in rabbits. Blood may be used in the initial inoculation if the concentration and virulence of the virus is sufficiently high. Blood from a pig which had become febrile on the fifth day after inoculation with a spleen suspension of an eighth rabbit passage virus was defibrinated and injected into the ear vein of another rabbit. The rabbit became febrile twenty hours after inoculation.

Blood from the above febrile rabbit was defibrinated and 2 ml. injected into each of three rabbits by the intravenous route. Two of the animals became febrile and their blood was likewise defibrinated and passed to another group of rabbits. The blood from those that became febrile was then continued in other rabbits. In this way it is possible to transfer the virus from rabbit to rabbit for many passages.

It should be understood, of course, that not all of the inoculated rabbits develop temperatures above normal. Also the time required for development of a febrile condition may vary considerably, from about 8 hours to 5 or 6 days. For best results the blood used for preparing inocula for serial passage should be withdrawn during the febrile period, or at least shortly before or after. The duration of the fever will also vary considerably from a few hours to a few days.

Transfer of the virus to the rabbit is preferably made by the intravenous route although other methods are not precluded.

The preparation of inocula from tissue, or from blood, is a relatively simple matter well within the skill of the art. Tissue, fibrinogen, and other matter that might interfere with the inoculation or cause undesirable reactions should be removed. Freezing and thawing the preparation may assist in freeing the virus from extraneous matter. Concentration of the virus by known methods is also a possible variation in the process within the scope of the invention.

As will be seen the new process includes the steps of inoculating animals not ordinarily susceptible to infection with hog cholera virus and after a period of time preparing an inoculum from the animal tissue or blood and then injecting the virus into a normal hog. This procedure is repeated until the virus can be maintained in the animal along for a large number of serial passages. The virus obtained from these serial animal passages appears to be less virulent for hogs but has the ability to give rise to the development of protective antibodies in the hog.

We claim:

1. A method of establishing growth of hog cholera virus in rabbits which comprises the step of inoculating a rabbit with virulent hog cholera virus and after a period of from about one to six days withdrawing virus from the said rabbit and inoculating a non-immune hog with a sufficient amount of the virus to infect said hog, allowing the virus thus transferred to the hog to propagate in said hog, withdrawing a quantity of the virus from said hog, and introducing it into a second rabbit and, after a period of from about one to six days, withdrawing the virus from said second rabbit and injecting it into a second non-immune hog and repeating said process of alternating the virus from rabbit to hog until the virus is so modified that it will propagate in the rabbit without return to a hog and continuing the passage of virus from rabbit to rabbit for at least twenty passages whereby the virus is so modified that it will no longer develop pathological symptoms when injected into a normal hog but will give rise to the production of protective antibodies.

2. A method of establishing hog cholera virus in rabbits which comprises the steps of inoculating a rabbit with virulent hog cholera virus and, after a period of from about one to six days, removing the rabbit's spleen and preparing a vaccine therefrom, inoculating a non-immune hog with said vaccine, after the virus has become established in the hog, as evidenced by the development of a febrile condition, withdrawing a quantity of the virus from said hog, and introducing it into a second rabbit, again, after a period of from about one to six days, removing the rabbit's spleen and preparing a vaccine therefrom and injecting a second non-immune hog with said virus-containing vaccine, removing virus from the second hog after it has developed a febrile condition, preparing a virus-containing vaccine therefrom, and injecting said vaccine into normal rabbits and continuing the alternate passage of virus from rabbit to hog until the virus will propagate in a rabbit without return to a hog and thereafter continuing the passage of the virus from rabbit to rabbit for at least twenty serial passages until the virus has been so modified that it will no longer develop pathological symptoms when injected into a normal hog but will give rise to the production of protective antibodies.

3. A method of preparing a hog cholera vaccine which comprises the steps of inoculating a rabbit with virulent hog cholera virus, and after a period of from about one to six days, recovering hog cholera virus from the said rabbit and inoculating non-immune hogs with a sufficient amount of the virus to infect said hog and after the virus has become established in the hog by evidence of the development of a febrile condition recovering a quantity of the virus from said hog and introducing it into a second rabbit, again, after a period of from one to six days recovering a quantity of virus from said second rabbit and injecting it into a second non-immune hog, and after the hog has developed a febrile condition recovering virus therefrom and introducing said virus into normal rabbits and continuing the alternate passage of virus from rabbit to hog until the virus will propagate in the rabbit without being returned to the hog and continuing the passage of the virus from rabbit to rabbit for at least twenty passages until the virus obtained from the rabbit will no longer develop pathological symptoms when injected into a normal hog but will give rise to the production of protective antibodies, thereafter recovering the virus from the rabbit and preparing a vaccine effective in protecting normal hogs against hog cholera.

4. A method of preparing a hog cholera vaccine which comprises the steps of inoculating a rabbit with virulent hog cholera virus and, after a period of from about one to six days, recovering hog cholera virus from said rabbit, and inoculating a non-immune hog with a sufficient amount of the virus, recovered from said rabbit, to infect the hog, and after the virus has become established in the hog, by evidence of the development of a febrile condition, recovering a quantity of virus from said hog and introducing it into a second rabbit, after a period of from one to six days, recovering a quantity of virus from said second rabbit, and injecting a sufficient amount of said virus into a second non-immune hog to infect the hog, and after the hog has developed a febrile condition, recovering virus therefrom and introducing said virus into normal rabbits, and continuing the passage of said virus from rabbit to rabbit, with retrun of the virus to its normal hog host, as necessary to maintain the virus and insure its continued propagation in the rabbit, and after at least twenty consecutive passages from rabbit to rabbit, whereby the original virulent strain has been so modified that it will no longer develop pathological symptoms when injected into a normal hog but will give rise to the production of protective antibodies, recovering the virus and removing tissue associated therewith to obtain a vaccine effective in protecting normal hogs against hog cholera.

5. A hog cholera vaccine capable of stimulating the production of protective hog cholera antibodies when injected into normal non-immune hogs, without producing the usual pathological symptoms of hog cholera, said vaccine containing a live, non-pathogenic strain of hog cholera virus, developed by the process of claim 1.

HERALD R. COX.
HILARY KOPROWSKI.

REFERENCES CITED

The following references are of record in the file of this patent:

UNITED STATES PATENTS

| Number | Name | Date |
|---|---|---|
| 2,012,789 | Kraybill | Aug. 27, 1935 |
| 2,271,819 | Green | Feb. 3, 1942 |
| 2,369,267 | Tilley | Feb. 13, 1945 |

OTHER REFERENCES

Eccles et al.: "The demonstration of a change in the antigenic structure of a bovine strain of foot-and-mouth disease virus during serial transmission in the guinea pig," in J. Comp. Path. Therap. 50 (1937), pages 412–420.

Ten Broeck: J. Exp. Med. 26 (1917), pages 441–51.

Healy et al.: "Attenutation of Hog Cholera Virus," J. Infect. Dis. 19, 569–71 (1916).

Koprowski on Hog Cholera Virus in Rabbits, pages 178–183; Baker on Hog Cholera Virus in Rabbits, pages 183–187 (both of above in Proc. Soc. Exptl. Biol. & Med., vol. 63, #1, Oct. 1946.